UNITED STATES PATENT OFFICE.

HARRY W. MORSE, OF TRONA, CALIFORNIA, ASSIGNOR TO AMERICAN TRONA CORPORATION, OF TRONA, CALIFORNIA, A CORPORATION OF DELAWARE.

PROCESS FOR SEPARATING POTASSIUM COMPOUND FROM BRINES.

1,343,401.  Specification of Letters Patent.  Patented June 15, 1920.

No Drawing.  Application filed November 26, 1918. Serial No. 264,339.

*To all whom it may concern:*

Be it known that I, HARRY W. MORSE, a citizen of the United States, residing at Trona, in the county of San Bernardino and State of California, have invented a new and useful Process for Separating Potassium Compound from Brines, of which the following is a specification.

This invention relates to separation of a potassium salt from solutions containing the same, together with other salts, and particularly to separation of potassium chlorid from brines, brine-residues, or mother liquors, containing potassium chlorid and borax as important constituents, and resulting, for example, from the treatment of Searles Lake or similar brines for the recovery of potassium compounds. In this treatment, after the removal of the major portion of the sodium chlorid and of some of the other salts present, there remains a solution consisting largely of potassium chlorid and borax, and the main object of the present invention is to separate the potassium chlorid substantially free from borax, from such a solution.

The composition of the hot liquor obtained by evaporation and treatment of Searles Lake brines from which much of the sodium chlorid and other salts have been removed by such treatment may be stated as approximately:

| | |
|---|---|
| Potassium chlorid | 16% |
| Borax | 7 |
| Sodium chlorid | 10 |
| Sodium carbonate | 8 |
| Sodium sulfate | 2 |
| Total solids | 43% |

The presence of such a considerable proportion of borax, as well as sodium chlorid in the product obtained from this solution, detracts from its value as a fertilizer or for other purposes. The potassium chlorid may be obtained comparatively free from sodium chlorid by cooling and crystallizing operations, but the salt so obtained generally still contains an objectionable amount of borax, which under ordinary conditions of cooling tends to separate out to about the same extent, relatively speaking, as the potassium chlorid.

I have found that by very rapidly cooling the solution, the potassium chlorid may be caused to separate from the solution, without substantial admixture of borax, and my invention is based on this fact.

My invention may be carried out as follows: The solution coming from the preliminary concentrating, and separating operations for the removal of common salt, and other salts, and having about the composition above stated and a temperature of 90° to 95° C. is passed through cooling apparatus of any type adapted for rapid cooling, for example, tanks containing pipes through which cooling liquid is caused to circulate, and is thereby rapidly cooled to about 30° to 35° C., the cooling being effected in, say, from one to two hours. Under these conditions, the potassium chlorid crystallizes substantially free from borax (which is impossible with slow cooling), so that the resulting crystallized salt, after draining away the mother liquor, contains about 75 to 80% KCl, about 10% of moisture and about 2.5% borax. By centrifugal removal of the mother liquor from the salt, the moisture content may be reduced to say, 3.5% and the borax content to about .8%, the borax present being substantially limited to what is in solution in the mother liquor adhering to the salt. A still lower borax content may be obtained by washing with cold water, thus displacing adhering mother liquor from the salts. The mother liquor from which potassium compound has been recovered to the required extent by this process may then be treated in any suitable manner for recovery of other salts, for example, borax.

My invention depends on the selective effect of rapid cooling in separating potassium chlorid in preference to borax, the time element being the controlling factor in the selective action. It is therefore of the essence of my invention that the solution be cooled with sufficient rapidity to cause the required amount of potassium chlorid to crystallize, without separation in solid form of any substantial amount of borax. The solution during the cooling is in a condition of supersaturation with respect to borax, but by cooling rapidly, as stated, to cause crystallization of potassium chlorid and removing the mother liquor from the potassium chlorid crystals before the borax has time to crystallize, I prevent crystallization of any borax in solid form and obtain substantially pure potassium chlorid.

What I claim is:

1. The process of separating potassium chlorid from solutions containing the same, together with borax, which consists in subjecting such solution to sufficiently rapid cooling action to separate potassium chlorid without separation of borax in solid form.

2. The process of separating potassium chlorid from solutions containing the same, together with borax, which consists in reducing the temperature of such solution from about 90° C. to about 30° C. in less than two hours, thereby causing potassium chlorid to crystallize free from solid borax, and separating the crystallized salt from the mother liquor.

In testimony whereof I have hereunto subscribed my name this 16th day of November, 1918.

HARRY W. MORSE.